United States Patent Office 3,010,314
Patented Nov. 28, 1961

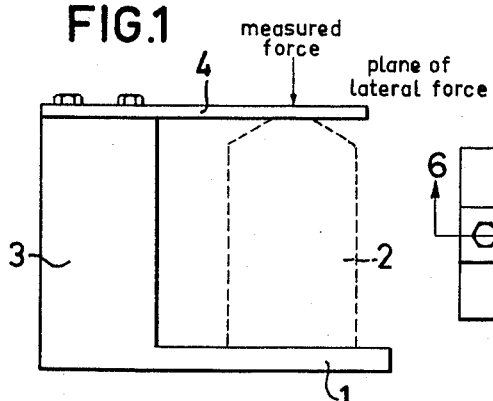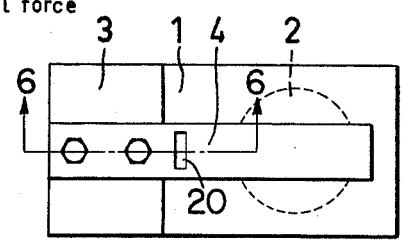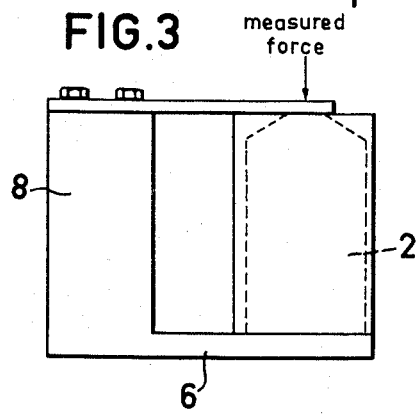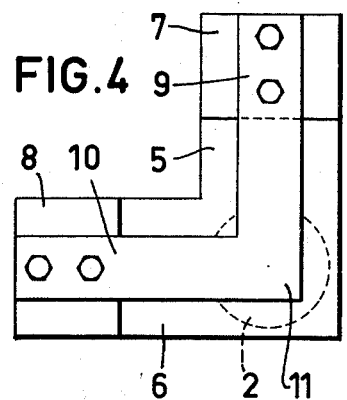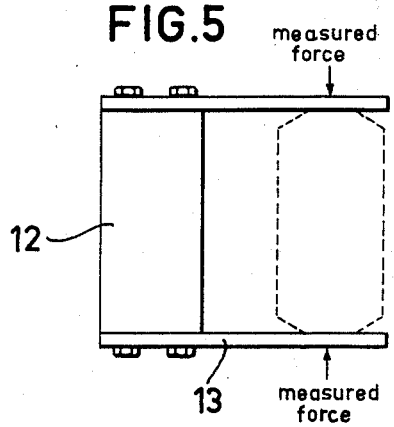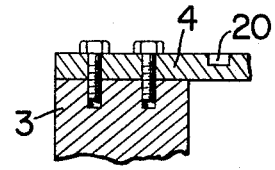

3,010,314
TRANSVERSE FORCE DISCHARGING DEVICE
Alf Fluur, 7 Gulddragargrand, Vallingby, Sweden, and Arne Söderholm, 7 Furusangsvagen, Bromma, Sweden
Filed Apr. 22, 1957, Ser. No. 654,327
Claims priority, application Sweden Apr. 27, 1956
5 Claims. (Cl. 73—141)

In order to measure the force of gravity or the weight of a body a comparatively rigid spring balance can be used, consisting of some type of steel cylinder with resistance strain gauges. The problems arising relate, in addition to the measuring accuracy of the gauge itself, to those forces which arise at right angles to the force of gravity. These arise owing to the fact that the support and the body expand and contract differently, for example at different temperatures, or owing to the fact that the dimensions of the body or the support change for other reasons. The difference in length arising between supports used gives rise to transverse forces. In order to reduce the action of such transverse forces the body is either guided laterally whereby lateral forces are prevented from arising or in certain cases the gauge is made so strong laterally that it can absorb the transverse forces without errors in the measurement arising. The latter method is excellent as far as certain constructions of gauges are concerned. It is also possible to make gauges which endure essentially greater transverse forces than those which can arise through changes of length which are meant here. However, such gauges are not economical. Generally one tries to supplement the capability of absorbing the transverse force of the gauge by some mechanical guiding of the support point of the gauge. Then the latter consists of one or more springs with their longitudinal axis in the direction of the transverse force or of a diaphragm with its surface in the direction of the transverse force. However, usually it appears that it is difficult to make such a discharge device efficient, owing to the fact that, if sufficient stiffness in the spring in transverse direction is desired, its stiffness in the direction of the force to be measured will be considerable, if these devices are not mounted and adjusted with the greatest accuracy.

Most of the known existing transverse force discharging devices are built up as a supplement to the support devices of the measuring body. The said supports may consist of a spring directed in the direction of the transverse force, which spring is fixed to the support point of the gauge and to some point on the foundation. Adjustment of this spring must be carried out after the gauge has been mounted below the measuring body. This may per se meet with great difficulties, as the space for measuring devices in such connections usually are very small.

From United States Patents No. 2,488,347 and No. 2,488,348 it is already known to absorb transverse loads through a device consisting of a cylindrical pot with one or more axial pillars provided with strain gauges, there being attached to the upper end of the wall of the cylinder a circular diaphragm against the lower side of which the upper side of the pillar supports, or which is provided with a central hole through which the pillar goes. However, these devices have not been intended for and probably have not been used for the same purpose as the device according to the invention, viz., to discharge very great transverse loads, as for example those arising in weighing railway carriages or the like. Particularly in this case very great retardation forces may arise at deceleration of the carriage when placing the latter on the load platform, which retardation forces, which are transverse forces, can be as great as or even greater than the measured force.

Then it will be extremely difficult to construct this known device, as the absorption of forces by the diaphragm varies non-linearly with the downward bending, that is, the compression of the pillar of the gauge and the dimensions of the transverse force discharging diaphragms for this reason are limited.

These disadvantages are eliminated by the present invention, which relates to a device in dynamometers operating with strain gauges, and the invention is characterized in that the dynamometer is mounted in a transverse force discharging holder consisting of an L-shaped member against the base of which the dynamometer rests, while to the end of the stem of the L one end of a substantially flat spring parallel with the base of the L is fixed, the other end of the said spring being free and the plane of the said spring being at right angles to the plane going through the base and the stem of the L, the said spring extending over the dynamometer, and may possibly also exert a pressure thereagainst. The base plate of the holder may either be attached to its support or may rest loosely thereon.

By the device according to the invention the difficulties of mounting the gauge are eliminated due to the fact that the gauge and the holder are first put together and thereafter placed under the support point of the measuring body.

The transverse force discharging device is preferably made as a supplement to the gauge itself. Then the device is not rigidly connected with the support point of the measuring body and neither with the gauge. It is easily made with sufficient stiffness in the transverse load direction and it is also very simple to manufacture, as the two planes through the upper side of the base of the L and through the upper side of the stem can be worked with precision in a machine. The distance therebetween, which should equal the height of the gauge cylinder, is, however, not critical for the function of the device.

Embodiments according to the invention are shown in the drawing.

FIGURES 1 and 2 show an embodiment of the invention intended for such a case when transverse loads can be expected in a certain determined direction. In FIGURE 1 the device is shown in lateral view, the forces attacking along the said plane. FIGURE 2 shows the device seen in plan view. FIGURES 3 and 4 show corresponding views of a modification of the invention, and FIGURE 5 shows a side view of another variant. FIG. 6 is a detail sectional view taken along line 6—6 of FIG. 2.

The device shown in FIGURES 1 and 2 consists of an L-shaped foundation or holder of a stiff material, for example steel. The base 1 of the L carries the gauge 2. This is presumed to consist of a cylinder with limited extension, for example in accordance with U.S. application Serial No. 627,177, filed December 10, 1956, by the co-applicant Arne Soderholm, now Patent No. 2,984,102. The vertical stem 3 of the L is rigidly connected with the base of the L. The height of the L (the height of the stem) equals the height of the gauge. A cantilever spring 4 is fixed at one end thereof to the upper end of the stem. The other end of the spring is disposed adjacent, i.e. close to or in contact with the upper side of the gauge 2. The adjustment of the spring is not critical but it can rest with some contact pressure thereagainst, or there may be a little interspace between the spring and the gauge.

If a force to be measured is applied, which has the direction of the axial direction (vertically) of the gauge, the gauge will be somewhat compressed. The said spring will be bent downwards correspondingly. For this reason the spring is made substantially flat and in such a manner that the stiffness in the direction of the force to be measured is slight in relation to the stiffness of the gauge in the same direction. This can be accentuated thereby that the spring is weakened close to the root rigidly connected with the L by providing holes or groove-like milled recesses (illustrated by the reference numeral 20 in FIG. 6) transversely to the axial direction. If there is simultaneously a force component at right angles to the force to be measured and directed along the longitudinal axis of the spring (or possibly at right angles to the plane of the paper), such a force brings about deformations of the spring as well as of the gauge, the latter being subjected to a bending moment. This spring is made considerably stiffer against forces in this plane than the gauge, for which reason the transverse load is substantially absorbed by the spring. A condition for this is that the other end of the spring, that is, that end that is fixed to the upper end of the L is rigidly connected with the base of the L.

In order to improve the absorption of force for transverse forces at right angles to the plane of the paper a spring may be provided also in this direction. This is shown in FIGS. 3 and 4.

The foundation or holder consists in this case of an angular base and a stem 7 and 8 respectively attached to each angle leg 5 and 6 respectively. To the upper ends of the stems an angular spring 9, 10 is attached which with its angle point portion 11 is located above the gauge 2 in a similar manner as described with regard to the end portion of the spring 4 shown in FIGURES 1 and 2. This spring 9, 10 is therefore well adapted to absorb transverse forces in all directions at right angles to the forces to be measured.

In FIGURE 5 a device is shown which differs from the device according to FIGURE 1 only therein that the base of the L consists also of a spring 13 attached to the stem 12.

The devices described and shown are only intended as examples and the details can be modified in several ways within the scope of the invention.

What we claim is:

1. A transverse force discharging device for transmitting a substantially vertical force to be measured to a measuring device such as a load cell, a dynamometer or the like comprising an L-shaped member having a horizontal base portion and a vertical stem portion, said base portion supporting the lower surface of the measuring device positioned thereon, and a horizontal flat cantilever spring rigidly secured at one end to said vertical stem at a distance above said base portion substantially equal to the height of said measuring device and extending horizontally above said measuring device adjacent the upper surface thereof, said spring having a rectangular transverse cross section with a greater horizontal dimension than vertical dimension and being readily deflexible in the vertical direction upon the application thereon of the force to be measured but resisting deflection in the horizontal direction to substantially absorb horizontal components of said force.

2. Apparatus as defined in claim 1 wherein said spring is weakened adjacent its connection to the vertical stem portion of the L-shaped member to permit ready vertical deflection of said spring.

3. Apparatus as defined in claim 2 wherein said spring has at least one recess therein adjacent its connection to the L-shaped member, said recess extending transversely to the longitudinal axis of the spring.

4. Apparatus for transmitting a substantially vertical force to a measuring device such as a load cell, a dynamometer or the like comprising a horizontal unitary L-shaped base member, the extremity of each leg of said base member having a vertical stem secured thereto, the angle pointed portion of said base member supporting the lower surface of the measuring device positioned thereon, and a horizontal unitary flat L-shaped spring member secured at its extremities to said vertical stems at distances above said base member substantially equal to the height of said measuring device, the angled pointed portion of said L-shaped spring member being arranged adjacent to the upper surface of said measuring device, said spring being readily deflexible in the vertical direction upon the application thereon of the force to be measured but resisting deflection in the horizontal directions to substantially absorb horizontal components of said force.

5. Apparatus as defined in claim 4 wherein said base member consists of an L-shaped flat spring.

References Cited in the file of this patent

UNITED STATES PATENTS

| | | |
|---|---|---|
| 2,333,313 | Henderson | Nov. 2, 1943 |
| 2,720,111 | Clark | Oct. 11, 1955 |
| 2,802,660 | Williams | Aug. 13, 1957 |
| 2,809,517 | Schmidt | Oct. 15, 1957 |

FOREIGN PATENTS

| | | |
|---|---|---|
| 457,295 | Great Britain | Nov. 25, 1936 |
| 716,572 | Great Britain | Oct. 6, 1954 |
| 974,360 | France | Sept. 27, 1950 |